No. 818,737. PATENTED APR. 24, 1906.
J. M. BROOKS.
DUMPING WAGON.
APPLICATION FILED APR. 29, 1905.
2 SHEETS—SHEET 2.
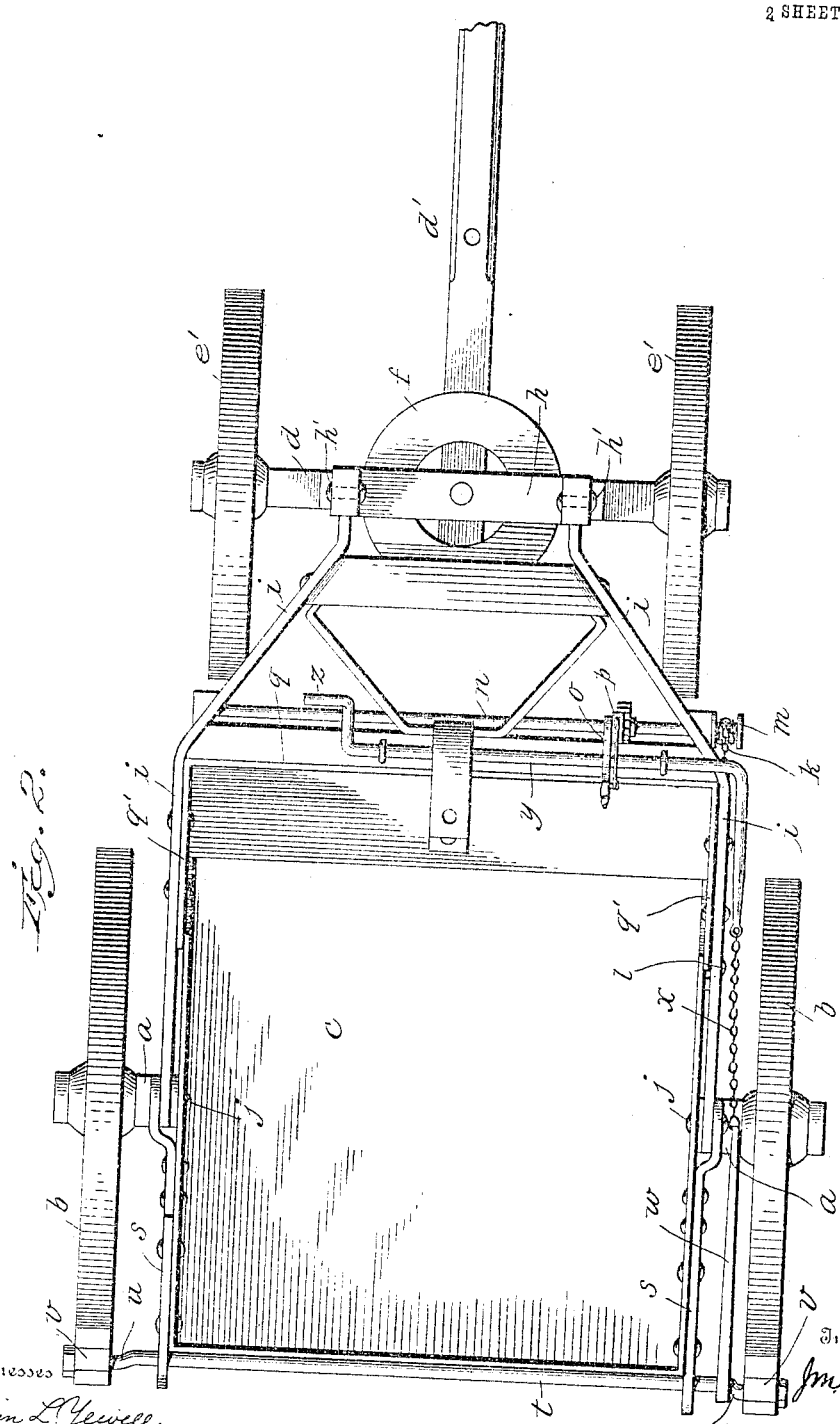

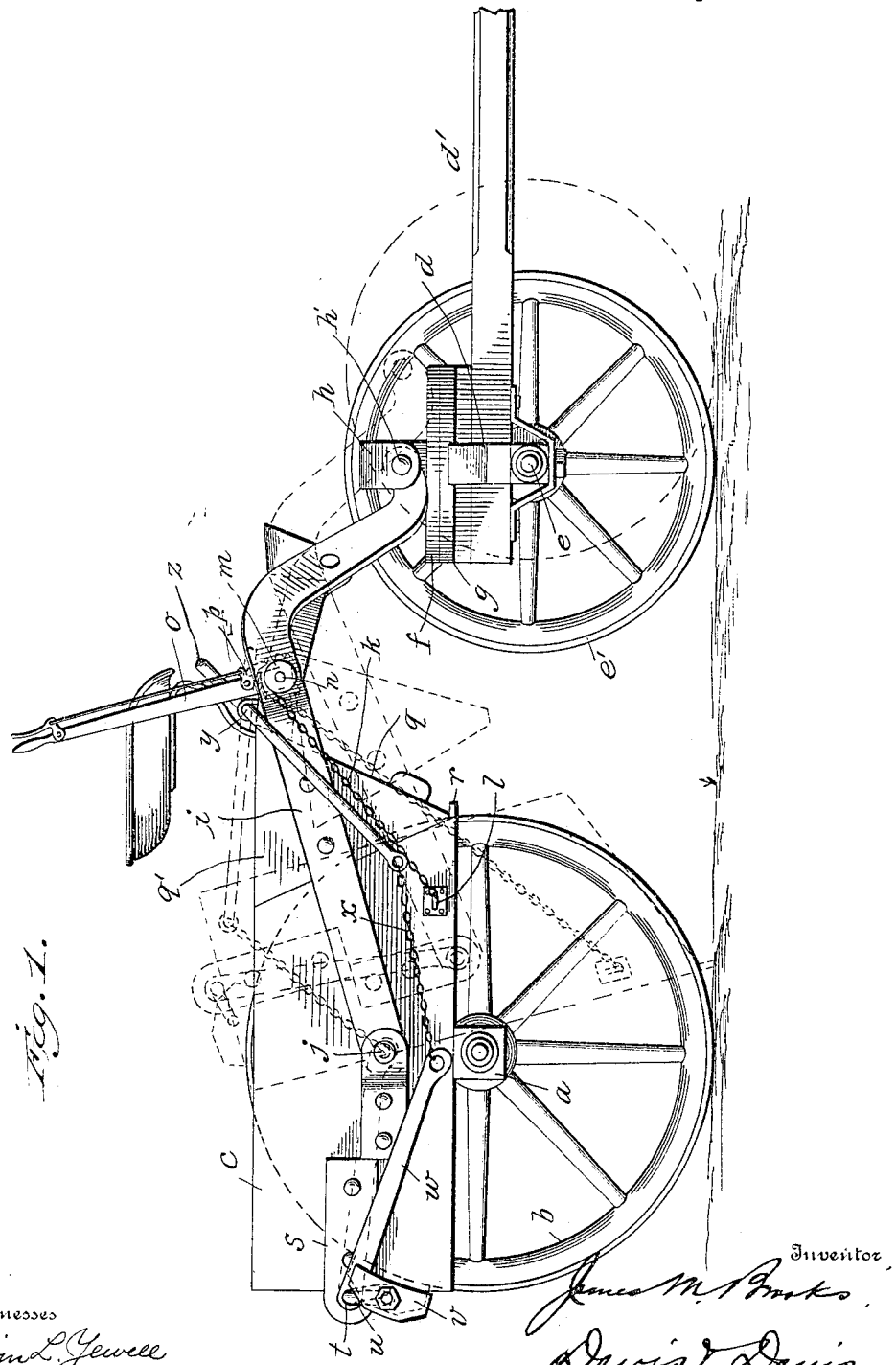

UNITED STATES PATENT OFFICE.

JAMES MOXEY BROOKS, OF MOLENA, GEORGIA.

DUMPING-WAGON.

No. 818,737.  Specification of Letters Patent.  Patented April 24, 1906.

Application filed April 29, 1905. Serial No. 258,064.

*To all whom it may concern:*

Be it known that I, JAMES MOXEY BROOKS, a citizen of the United States, and a resident of Molena, county of Pike, State of Georgia, have invented certain new and useful Improvements in Dumping-Carts, of which the following is a full and clear specification, reference being had to the accompanying drawings, in which—

Figure 1 is a side elevation of my improved wagon, the near wheels being removed for the purposes of illustration; and Fig. 2 a plan view thereof.

The object of this invention is to produce a simple and durable dumping wagon or cart which shall be especially useful where excavated material is to be transferred to a more or less distant point and to be spread over the ground at the place of dumping, thus avoiding the employment of a gang of men to spread the material at the dumping-place, as more fully hereinafter set forth.

To the accomplishment of this object and such others as may hereinafter appear the invention consists of the parts and combinations of parts hereinafter fully described, and particularly pointed out in the appended claims, reference being had to the accompanying drawings, forming a part of this specification, in which the same reference characters designate like parts throughout the several views.

Referring to the drawings by letters, $a$ designates the rear axle mounted on the wheels $b$. The box or body $c$ of the cart fits down on this axle and is rigidly secured thereto in any suitable manner, so that the box shall be capable of tilting forward, the spindles of the axle serving as pivots for this tilting action.

The front axle $e$ is mounted on the front wheels $e'$ and supports a suitable bolster or frame $d$, to which the tongue $d'$ is secured. Upon this bolster or frame is bolted the lower member $g$ of a fifth-wheel, and on this bearing is rotatably mounted the upper member $f$ of the fifth-wheel, said bearing having rigidly attached to it a cross-bar $h$. The forward portions of the draft-irons $i$ are bent inward and downward and pivoted by horizontal pivots $h'$ to the upturned ends of bar $h$, thereby pivotally connecting the draft-irons with the front axle, so that the front axle may swing not only laterally in the usual manner, but forward and backward. Any other manner of connecting the draft-irons to the front truck so that the tongue may have practically a universal movement may be employed, as is evident.

The draft-irons $i$ pass rearward outside of the cart-body and are pivotally attached to the same at $j$, these pivotal points being preferably arranged, as shown, in a vertical line with the axle-spindles.

Journaled in the draft-frame, which, as stated, is composed of the draft-bars $i$, just forward of the cart-body is a transverse shaft $n$, on one end of which is a drum $m$, to which the upper end of a chain $k$ is attached and wound, the lower rear end of this chain being connected detachably to the lower forward end of the wagon-body by means of a hook $l$, rigidly attached to the body. Pivotally mounted on shaft $n$ is a lever $o$, which extends up to a point within convenient reach of the driver and which is provided with a pawl $p$, engaging a ratchet-wheel on the shaft.

The body of the wagon may widen forwardly, so that its forward end shall tend to swing downward. When the body is so constructed and it is desired to dump a load, the driver simply disengages pawl $p$ from this ratchet-wheel and permits the forward end of the cart to drop to the ground. Then by the continued forward movement of the vehicle the load is not only emptied, but spread along the surface of the ground. By the chain-and-ratchet device the driver can regulate the distance the forward end of the cart-body shall drop, and in that way regulate the spreading of the material. The chain may be made long enough to permit the cart-body to be entirely inverted, and thus dump the load practically in one spot. This inverting of the body is accomplished by the engagement of its front lower edge with the ground and the continued forward movement of the vehicle. Then by drawing on the chain the driver may pull the cart-body back to its normal position, backing the vehicle if it be necessary to do so in order to avoid the strain that would occur if the cart-body were pulled forward while the vehicle was at a standstill. It is obvious that another drum $m$ and chain $k$ may be employed on the opposite side of the vehicle, if it be found desirable to do so.

It will be observed that the arrangement of parts will not prevent the vehicle from being readily turned around within a minimum of space, and, in fact, the vehicle may be turned in either direction while the load is being emptied and spread.

To close the forward end of the wagon-box, I mount on the draft-frame an end-gate consisting of a front wall $q$, preferably inclining downward and rearward, and side walls $q'$, adapted to slightly overlap the front side edges of the wagon-box. This end-gate is mounted stationarily on the draft-frame so that it will remain in its elevated position when the body is dropped for unloading, as shown in dotted lines in Fig. 1. The lower end of the end-gate is engaged by a forward-projecting lip $r$, carried by the front edge of the bottom of the wagon-body, thereby limiting the upward movement of the front end of the wagon-body. This lip $r$ also facilitates spreading the dumped material, as is obvious.

Journaled in rearwardly-extending bearings $s$ $s$, riveted to the sides of the wagon-box, is a transverse shaft $t$, whose ends are bent into cranks $u$, each of which carries a brake-shoe $v$, adapted when the shaft is rotated to be applied to the tire of the adjacent wheel. Rigidly attached to one of the projecting ends of the shaft is an arm $w$, which extends forward and normally rests on the axle and is connected by a chain $x$ to the rearward-extending arm of a transverse crank-shaft $y$, journaled on the draft-frame and provided with a foot-crank $z$ within convenient reach of the driver's seat $a'$, also mounted on the draft-frame in a suitable manner. To apply the brakes in going downhill, the driver throws the crank $z$ forward, which raises arm $w$ and rocks shaft $t$ and throws the shoes against the wheels. This brake device is also helpful in dumping the load, as by first releasing the ratchet device and then applying the brake the rear end of the wagon-body will be raised by the forward movement of the vehicle, thus dumping the load, and by so proportioning the arm $w$ that when the brake is applied its point of connection to chain $x$ shall be in horizontal alinement with pivot $j$, as shown in dotted lines in Fig. 1, the brake will remain on during the entire dumping action—that is, until the driver releases the foot-crank $z$. With this dumping device it is not absolutely necessary to mount the wagon-body on the axle so that it will tend to dump automatically, as the friction and leverage will be ample to tilt and dump the body automatically.

Another object of widening the box forwardly is to give more capacity to the front end and at the same time facilitate the discharge of the load.

The peculiar universal connection between the front truck and the frame is advantageous in that in addition to the usual lateral swing of the tongue in turning the vehicle the tongue is free to vibrate up and down while the vehicle is passing over rough places without communicating the motion to the body or box.

It will be apparent to those skilled in the art that various mechanical embodiments of the invention are possible, and I therefore do not wish to be limited to the exact arrangement and construction shown.

What I claim, and desire to secure by Letters Patent, is—

1. In a dumping-wagon, the combination of front and rear axles and transporting wheels, a wagon-body mounted on the rear axle and adapted to tilt downward at its front end, this front end being open, and draft appliances connecting the tilting body with the front part of the vehicle, substantially as set forth.

2. In combination, a rear axle and a front axle mounted on wheels, a wagon-box rigidly mounted on said rear axle in such manner that the wagon-box shall normally tend downward at its forward end, a draft-frame pivotally connecting the wagon-body to the front part of the vehicle, and means for lifting the front part of the body and holding it up out of engagement with the ground.

3. In combination, a vehicle consisting of a rear axle mounted on wheels, a front truck, a wagon-box mounted on the rear axle and adapted to swing downward at its forward end on the spindles of the rear axle as pivots, draft devices connecting the cart-body with the front truck, the point of connection to the body being above the spindles of the rear axle, and means carried by the draft-frame for releasing the front end of the wagon-box and for elevating it after it is dumped.

4. In a dumping-wagon, the combination of a rear axle, a wagon-box mounted thereon and open at its front end, the forward part of the wagon-box being heavier than the rear part so as to normally tend to tilt downward, draft appliances and a front truck connected thereto, and means for lowering and raising the front end of the wagon-box.

5. In a dumping-wagon, the combination of a wagon-box mounted tiltingly on wheels, its front end being open, a front axle and wheels and means connecting the same to the wagon-box at a point above the tilting-point of the wagon-box, for the purpose set forth.

6. In a dumping-wagon, the combination of a rear axle mounted on wheels, a box or body mounted on the rear axle and adapted to tilt downward at its forward end to dump, a front truck and draft devices connecting the same to the wagon-body, means for raising and holding up the front end of the wagon-body, and a front end-gate mounted on the draft-frame, substantially as set forth.

7. In a dumping-cart, the combination of transporting-wheels, a wagon-box thereon open at its forward end and adapted to tilt forwardly to dump, and means for raising the box after dumping and holding it in its raised position, substantially as described.

8. In a vehicle of the class described, the combination, of wheels and a wagon-box open at its forward end and adapted to tilt and dump forwardly, the wagon-box being widened toward its front end, and means for raising and holding up the wagon-box after dumping.

9. In a dumping-cart, the combination of wheels and a wagon-box mounted thereon and open at its front end and adapted to tilt and dump forwardly, and positively-actuated dumping devices operated by the forward movement of the vehicle, substantially as described.

10. In a dump-cart, the combination of rear and front axles and wheels, a wagon-box mounted rigidly on the rear axle and open at its front end, a draft-frame pivotally connecting the front truck with the wagon-box, the pivotal point being located above the axle, and means for raising the front open end of the wagon-box and holding it in its raised position, substantially as set forth.

11. In a dump-wagon, the combination of rear and forward axles and their wheels, a box mounted on the rear axle and open at its forward end and adapted to tilt forward on the spindles of the rear axle, a draft-frame pivotally connecting the front axle to the wagon-box, means for raising the front end of the wagon-box and holding it up, and means for dumping the wagon-box consisting of a crank-shaft mounted at the rear end of the wagon-box and carrying brake-shoes adapted to engage the rear wheels, and means for applying the brake-shoes and holding them to the wheels during the act of dumping.

12. In a dump-wagon, the combination of rear and front axles and their wheels, a box mounted on the rear axle and open at its forward end and adapted to tilt forward on the spindles of the rear axle, a draft-frame pivotally connecting the front axle to the wagon-box, means for raising the front end of the wagon-box and holding it up, and means for dumping the wagon-box consisting of a crank-shaft mounted at the rear end of the wagon-box and carrying brake-shoes adapted to engage the rear wheels, an arm attached to the crank-shaft and extending forward, a chain pivotally connected to the forward end of this arm, this pivotal connection being coincident with the connection between the wagon-box and the draft-frame, and means for pulling on said chain to apply the brake-shoes and dump the box.

13. In a dump-wagon, the combination of rear and forward axles and their wheels, the rear axle being straight, a wagon-box adapted to discharge at its forward end and mounted over and upon the rear axle, a draft-frame pivotally connecting the front truck with the wagon-box at a point above the axle, and means for releasing the wagon-box after it is dumped and holding it in its raised position.

14. In a dump-wagon, the combination of rear and forward axles and their wheels, the rear axle being straight, a wagon-box adapted to discharge at its forward end and mounted over and upon the rear axle, a draft-frame pivotally connecting the front truck with the wagon-box at a point above the axle, and means for releasing the wagon-box after it is dumped and holding it in its raised position, and an end-gate mounted on the draft-frame in such a position as to close the front end of the wagon-box when it is raised.

15. In a dump-wagon, the combination of a rear axle and wheels, a wagon-box mounted rigidly over and upon the same and adapted to tilt forward on the axle-spindles and adapted to discharge at its forward end, a front truck, a draft-frame pivotally connected at its forward end to the front truck and at its rear end to the wagon-box at a point above the rear axle, the axes of these pivots being horizontal, and means for lowering the front end of the wagon-box to dump the same and spread the load, said means being regulable so that the depth may be regulated.

16. In a dump-wagon, the combination of a rear axle and wheels, a wagon-box mounted rigidly over and upon the same and adapted to tilt forward on the axle-spindles and adapted to discharge at its forward end, a front truck, a draft-frame pivotally connected at its forward end to the front truck and at its rear end to the wagon-box at a point above the rear axle, the axes of these pivots being horizontal, an end-gate on the wagon-frame adapted to close the forward end of the wagon-box when it is in an elevated position, and means on the draft-frame for raising and holding up the forward end of the wagon-box.

17. In a dump-wagon, the combination of a rear axle and wheels, a wagon-box mounted rigidly over and upon the same and adapted to tilt forward on the axle-spindles and adapted to discharge at its forward end, a front truck, a draft-frame pivotally connected at its forward end to the front truck and at its rear end to the wagon-box at a point above the rear axle, the axes of these pivots being horizontal, an end-gate on the wagon-frame adapted to close the forward end of the wagon-box when it is in an elevated position, means on the draft-frame for raising and holding up the forward end of the wagon-box, means for lowering the front end of the
5 wagon-box to dump the same and spread the load, said lowering means serving also as elevating means, and a device for locking said means, for the purposes set forth.

In testimony whereof I hereunto affix my signature, in the presence of two witnesses, this 28th day of April, 1905.

JAMES MOXEY BROOKS.

Witnesses:
 WILEY M. JORDAN,
 D. M. WILLIS.